United States Patent [19]

Shima et al.

[11] Patent Number: 5,327,569

[45] Date of Patent: Jul. 5, 1994

[54] DATA DRIVEN TYPE PROCESSOR INCLUDING A GENERATION MANAGEMENT SYSTEM

[75] Inventors: Kenji Shima; Yoshie Inaoka, both of Hyogo, Japan

[73] Assignee: Mitsubishi Denki Kabushiki Kaisha, Tokyo, Japan

[21] Appl. No.: 571,737

[22] Filed: Aug. 23, 1990

[30] Foreign Application Priority Data

Aug. 28, 1989 [JP] Japan .................... 1-218658
Aug. 28, 1989 [JP] Japan .................... 1-218659

[51] Int. Cl.$^5$ ............................................ G06F 7/00
[52] U.S. Cl. ........................... 395/800; 364/232.22; 364/281.3; 364/281.8; 364/284.2; 364/DIG. 1; 395/375
[58] Field of Search ................ 395/775, 375, 800, 650

[56] References Cited

U.S. PATENT DOCUMENTS

| | | | |
|---|---|---|---|
| 3,978,452 | 8/1976 | Barton | 395/775 |
| 4,847,755 | 7/1989 | Morrison | 395/650 |
| 5,072,377 | 10/1991 | Asai | 395/400 |
| 5,115,510 | 5/1992 | Okamoto | 395/775 |
| 5,117,489 | 5/1992 | Komori | 395/375 |

*Primary Examiner*—Eric Coleman
*Attorney, Agent, or Firm*—Wolf, Greenfield & Sacks

[57] ABSTRACT

A system for actualizing a process of a multi-generation packet by managing the generations of the packet inputted in a firing process module of a data driven type processor. The firing process module includes a generation management unit for rearranging the disk order of a sequence relationship associated with a periodic circulation of the generation numbers of a packet inputted. Further included is a subsystem for separating an address space in hashing when obtaining an address of a queuing memory of the firing process module.

6 Claims, 12 Drawing Sheets

| GENERATION NUMBER (THE ORDER OF INPUTTING TO GENERATION MANAGEMENT UNIT) [MANAGEMENT GENERATION NUMBER] | JUDGMENT SIGNAL (JUDGMENT BIT) | JUDGMENT SIGNAL + GENERATION NUMBER |
|---|---|---|
| gen# 126 ( 127 ) | 1 | 254 (=128+126) |
| gen# 127 (127→0) | 0 | 127 (= 0+127) |
| gen# 0 (0 → 1) | 1 | 128 (=128+ 0 ) |
| gen# 127 ( 1 ) | 0 | 127 (= 0 +127) |
| gen# 126 ( 1 ) | 0 | 126 (= 0 +126) |
| gen# 0 ( 1 ) | 1 | 128 (=128+ 0 ) |
| gen# 1 ( 1→ 2) | 1 | 129 (=128+ 1 ) |
| [INCREMENT OF MANAGEMENT GENERATION NUMBER] | | [GENERATION NUMBER EMPLOYED IN TAG COMPARING UNIT] |

(a) OPERATION WHEN REQUIRING NO DATA REPLACEMENT (b) OPERATION WHEN REQUERING DATA REPLACEMENT

DATA DRIVEN TYPE PROCESSOR INCLUDING A GENERATION MANAGEMENT SYSTEM

FIELD OF THE INVENTION

The present invention is directed generally to a data driven type processor, and more particularly, to a packet generation number management system in a data driven type processor.

DESCRIPTION OF THE PRIOR ART

Turning first to FIG. 9, there is illustrated a block diagram of a construction of a prior art data driven type processor disclosed in, e.g., Japanese Patent Laid-Open Publication No. 63-220328. In FIG. 9, the numeral 1 represents an input module for receiving packets from the outside; 2 a program storing module, into which data flow graphs are stored, for reading a command in accordance with a content of a tag (an identifier of data) of the packet outputted from the input module 1 and outputting the command as a command packet; 3 a firing process module for receiving the command packet outputted from the program storing module 2, finding a command packet having a tag paired with the tag of the previous command packet and outputting this command packet as an arithmetic packet or storing the command packet outputted from the program storing module 2; 4 an arithmetic operation module for performing an arithmetic operation specified by the command defined as a part of the tag of the arithmetic packet upon receiving the arithmetic packet outputted from the firing process module 3 and outputting a resultant packet; and 5 an output module for outputting the resultant packet to the outside when an outside flag conceived as a part of the tag indicates an "outside output" after receiving the resultant packet given from the arithmetic operation module 4 and, when indicating an "inner output", outputting the resultant packet to the input module 1.

FIG. 10 is a block diagram depicting a configuration of the firing process module 3 of FIG. 9. Referring to FIG. 10, the reference numeral 31 denotes an address conversion unit for determining a memory address by hashing the tag of the command packet and outputting the memory address as well as a packet input signal. Designated at 32 is an address register for holding the memory address sent from the address conversion unit 31. A write register generally indicated at 33 is intended to hold the command packet and has PB1 (presence bits) showing validity/invalidity of the packet. The numeral 34 denotes a queuing memory for storing the packets and PBs, a function of which is to read the packet and the PBs stored in the memory address or to write the command packet from the write register 33 to the memory address outputted from the address register 32. Indicated at 35 is a read register for holding the command packet read from the queuing memory 34 and PB2. Note that the command packet inputted to the firing process module 3 is referred to as a first command packet, while the command packet read from the queuing memory 34 is referred to as a second command packet to enable them to be discriminated from each other.

A null judgment unit 36 acts to examine PB2 outputted from the read register 35 and outputs a judgment signal indicating whether the second command packet is valid or invalid. A tag comparing unit 37 makes a comparison between the tags of the first command packet outputted from the write register 33 and of the second command packet outputted from the read register 35, and judges an accordance or magnitudes thereof. The tag comparing unit 37 then outputs the comparative result in the form of a first comparative signal. If accordant with each other, the unit 37 outputs both of the first and second command packets. Whereas if discordant, the unit 37 outputs the command packet having a larger tag. The numeral 38 stands for a data pair generating unit adapted to output an arithmetic packet or a through-packet upon receiving both or any one of the first comparative signal outputted from the tag comparing unit 37 and the first and second command packets. If the first comparative signal indicates an "accordance", data of the second command packet is paired with the first command packet to be outputted as an arithmetic packet. Whereas if a "discordance" is shown, a through-packet is outputted to the first or second command packet which has the larger tag, the through-packet being arranged such that a through-packet flag defined as a part of that tag is brought into a through-state.

Upon receiving the packet input signal, the judgement signal and the first comparative signal, a control unit 39 performs the following control processes. The details are given as follows:
(1) Control over reading from or writing to the queuing memory 34;
(2) Control over outputting PB2 of the read register 35 to the null judgement unit 36 or the second command packet to the tag comparing unit 37;
(3) Control over outputting the first command packet of the write register 33 to the tag comparing unit 37; and
(4) Control over writing of the command packet and PB1 to the queuing memory 34 under such conditions that if the first comparing signal indicates the "accordance", PB1 of the write register 33 is made invalid; and whereas if the "discordance" is indicated, PB1 is made valid.

Turning next to FIG. 11, there is shown an input/output example of the address conversion unit 31 depicted in FIG. 10, wherein 9 bits corresponding to a queuing space 512 address are composed of gen#$_{3-0}$ and node#$_{4-0}$, while hashing from gen# (generation number/color number) and a destination node number (node#).

FIG. 12 is a block diagram depicting a construction of the tag comparing unit 37 of FIG. 10. Referring to FIG. 12, the numerals 371 and 372 designate first and second comparing circuits. The first comparing circuit 371 receives generation numbers or color numbers which are a part of the tags of the first and second command packets outputted from the read register 35 and the write register 33, and then makes a comparison therebetween. After judging the coincidence or magnitudes thereof, the first comparing circuit 371 outputs the comparative result as a second comparative signal. On the other hand, the second comparing circuit 372 receives destination node numbers conceived as a part of tags of the first and second command packets outputted from the read register 35 and the write register 33, and makes a comparison therebetween. After judging the coincidence or magnitudes thereof, the second comparing circuit 372 outputs the comparative result as a third comparative signal. A second register generally indicated at 373 serves to hold the second command packet outputted from the read register 35. A first register 374 holds the first command packet outputted from the write register 33. Designated at 375 is a comparative output judging circuit for outputting any one of the second and third comparative signals as the above-mentioned first comparative signal after receiving these second and third comparative signals, thereby controlling the first and second registers 374 and 373. More specifically, if the second comparative signals indicates the "discordance", this signal is outputted as a first comparative signal by which to control the first and second command packets held by the first and second registers 374 and 373.

The description will next focus on the operation.

Turning to the FIG. 13, there is illustrated a packet format employed in the data driven type processor. A packet consists of a tag (an identifier of data) and first and second data. The tag includes a through-packet flag, an outside flag, a generation number or color number (gen#), a destination node number (node#), a command and an L/R flag.

The input module 1 receives a packet having the tag inputted from the outside and the first data or a packet having the tag outputted from the output module 5 and the first data, and then outputs the packet to the program storing module 2. The program storing module 2 permits its memory to store a data flow graph. Immediately upon receiving the packet, the storing module 2 reads, while setting the destination node number defined a part of tag of the input packet as an address, the destination node number, the command and the L/R flag indicating whether the data included in the input packet becomes a left input or a right input of the command from the memory. Subsequently, the storing module 2 updates the destination node number, the command and the L/R flag, which are conceived as a part of the tag, and outputs these tag components as a first packet together with the first data.

The command packet is inputted to the firing process module 3, which in turn outputs an arithmetic packet.

The firing process module 3 has a format depicted in FIG. 10. The function thereof will be described with reference to FIG. 10. The first command packet outputted from the program storing module 2 is inputted to the write register 33 as well as to the address conversion unit 31. The address conversion unit 31 functions to output to the control unit 39 a packet input signal showing that the first command packet has been inputted. The conversion unit 31 hashes the generation number or color number and the destination node number which are the tag components of the first command packet, and outputs a determined memory address of the queuing memory 34. The control unit 39 to which the packet input signal has been inputted effects a control process to hold the memory address outputted from the address conversion unit 31 to the address register 32, whereby the address register 32 holds the memory address. Next, the control unit 39 outputs, as an indication of "reading", a mode signal showing a memory reading mode or a memory writing mode to the queuing memory, 34. The control unit 39 controls the address register 32 so that the register 32 outputs the memory address held therein to the queuing memory 34. The queuing memory 34, to which the mode signal and the memory address have been inputted, has, as illustrated in FIG. 14, a command packet including tags and data and also PBs as a set of information. The PB among the information represents bits indicating whether the tags and data are valid or not.

The queuing memory 34 receives the mode signal and the memory address outputted from the address register 32, and takes out the PBs and the command packet which are stored in a LOCATION, specified by the memory address, of the queuing memory 34 in order to output these PBs and the command packet to the read register 35. PB2 held by the read register 35 is outputted from the read register 35 to the null judgment unit 36 under control of the control unit 39. The null judgment unit 36 in turn outputs, to the control unit 39, PB2 outputted from the read register 35 as a judgment signal. Upon receiving the judgment signal, the control unit 39 writes, when this signal indicates an invalidity, a validity to PB1 of the write register 33. The control unit 39 then outputs the mode signal which has been set in "writing" to the queuing memory 34, and performs a control process to cause the address register 32 to output the memory address held therein to the queuing memory 34. Simultaneously, the control unit 39 causes the write register 33 to output the first command packet and PB1, which are held therein, to the queuing memory 34. The queuing memory 34, to which the mode signal indicating a "writing" mode has been inputted, stores PB1 and the first command packet which are outputted from the address register 32 to the memory address outputted from the address register 32. Therefore, when the judgment signals indicate the invalidity, a region in the queuing memory 34 which is specified by the memory address held by the address register 32 is null. The first command packet and PB1 which are held by the write register 33 are stored in the queuing memory 34, thereby having the command packet including the same tag.

When the judgment signal shows the valid state, the control unit 39 effects control to permit the write and read registers 33 and 35 to output, to the tag comparing unit 37, the first and second command packets held by the write and read registers 33 and 35.

The operation of the tag comparing unit 37 will be explained in conjunction with FIG. 12. The first command packet outputted from the write register 33 is held by a first register 374, while the second command packet outputted from the read register 35 is held by a second register 373. Sent to a first comparative circuit 371 are generation or color numbers defined as a part of tags of the first and second command packets outputted from the write and read registers 33 and 35. Destination node numbers are transferred to a second comparative circuit 372. The first comparative circuit 371 functions to make a comparison between the generation or color numbers of the two command packets for judging an accordance or magnitudes thereof. The circuit 371 then outputs the comparative result as a second comparative signal to a comparative output judging circuit 375. The second comparative circuit 372 compares the destination node numbers of the two packets and judges the accordance or magnitudes thereof. The comparative result is outputted as a third comparative signal to a comparative output judging circuit 375. The comparative output judging circuit 375 in turn outputs, when the second comparative signal indicates a "discordance (an impingement of the packets)", the second comparative signal as a first comparative signal. The first and second registers 374 and 373 are so controlled that one of the two command packets which has a larger generation or color number is outputted. If the second comparative signal shows a "discordance", the third comparative signal is outputted as a first comparative signal. When the third comparative signal exhibits the "accordance", the first and second registers 374 and 373 are controlled to output both of the command packets. Whereas if the "discordance (an impingement of the packets)" is exhibited, one of the two packets which has a larger destination node number is outputted.

Referring again to FIG. 10, the data pair generating unit 38 receives the first comparative signal outputted from the tag comparing unit 37 and both or any one of the first and second command packets. If the first comparative signal shows the "accordance", there is outputted the packet as an arithmetic packet with an addition of data of the second command packet to the data unit of the first command packet which is indicated by an L/R flag of the second command packet. When the first comparative signal shows the "discordance", a through-packet flag of the first or second command packet is brought into a through-state, and this command packet is outputted as a through-packet.

The control unit 39 receives the first comparative signal and makes, when this signal indicates the "accordance", PB1 of the write register 33 invalid. When giving an indication of being smaller than the tag of the first command packet, PB1 of the write register 33 is made valid. Concomitantly with this, a mode signal exhibiting "writing" is outputted to the queuing memory 34. The address register 32 is controlled to output a memory address held therein, while the write register 33 is controlled to output PB1 and the first command packet which are held therein. Subsequently, the queuing memory 34 stores the first command packet and PB1.

Based on the above-mentioned operations, if the first and second command packets accord with each other, the first and second command packets are fired and then outputted in the form of arithmetic packets. The second command packet of the queuing memory 34 makes invalid the region stored therein, and hence PB1 of the write register 33 is made invalid and written to the queuing memory 34.

When the tags of the first and second command packets do not coincide with each other (the impingement of the packets), and if the tag of the first command packet is smaller than that of the second command packet, the second command packet stored in the queuing memory 34 is replaced with the command packet inputted to the firing process module 3. Whereas if the tag of the first command packet is larger than that of the second command packet, the second command packet stored in the queuing memory 34 remains as it is. Instead, the first command packet is outputted.

FIG. 15 is a diagram of assistance in explaining the operations of replacing the data of the firing process module 31. The data replacing method involves the steps of making a packet having smaller numbers with respect to gen# and node# stay in the queuing memory 34 during the hash impingement in the queuing memory 34. The other packet is temporarily ejected into an external circulatory pipe line, and the priority of process is given to the packet requiring the preceding execution.

Turning to FIG. 15, there is shown an example of the operations. FIG. 15(a) illustrates the operation when data replacement is not needed, while FIG. 15(b) illustrates the operation when data replacement is required. To be specific, referring to FIG. 15(a), the queuing memory 34 has a packet A in which gen#=0, and node#=11H. A packet B in which gen#=0, and node#=21H enters the firing process module 3. In this case, the packet B is ejected, because node# is large. Referring to FIG. 15(b), the queuing memory 34 has the packet B in which gen#=0, and node#=21. On the occasion of an entry of the packet A in which gen#=0, and node#=11H, the packet A is left, while the packet B in which node# is large is ejected.

Particularly for a hash address supplied via the address conversion unit 31 of the firing process module 3 to the queuing memory 34, as shown in FIG. 11, there are employed gen#$_{3-0}$ and node#$_{4-0}$ (where gen# is herein used in common to a region and a color number defined as a common function identifier). This arrangement is intended to prevent hash impingement between the generations during a multi-generation input. Besides, the hash impingement due to a parallelism of the program is hindered by adopting the arithmetic node number in a flow executing a large program, thereby increasing an efficiency and velocity of the process.

In the above-described prior art data driven type processor, when the generation numbers make one circuit for further execution, the generation number inputted earlier becomes smaller than the generation number inputted later, resulting in such a problem that in the worst case, the process stops.

It is an object of the present invention, which has been devised to obviate the foregoing problems, to provide a data driven type processor capable of execution without causing a stoppage of a process even when executing the process in excess of a range of generation numbers.

SUMMARY OF THE INVENTION

According to the present invention, there is provided a data driven type processor comprising: an input module for taking in a packet inputted from the outside; a program storing module for reading a program stored previously in accordance with tags of the packet, generating new tags from the content thus read and outputting a packet together with data of the previous packet; a firing process module for detecting a packet having the tags to be fired for forming operand pairs from the tags of the previous packet, storing the inputted packet into a memory when detecting no packet and outputting the packet having the operand pairs when detecting the packet; an arithmetic process unit for effecting a process on the basis of pieces of arithmetic information contained in the tags after receiving the previous packet and outputting a resultant packet; and an output module having functions to judge the tags of the packet and to provide branches after judging whether outputting to the outside is performed or the internal process resumes with the aid of the input module.

A generation management unit provided in accordance with the present invention judges whether the generation numbers of the packet inputted are those having made one circuit of a range in which the generation numbers are expressible by a generation number region. If they are post-circuiting generation numbers, the result is outputted in the form of "1" to the tag comparing unit. Whereas in the case of pre-circuiting generation numbers, the result is outputted thereto in the form of "0". The tag comparing unit is arranged to exhibit a range that is twice as large as the former in which the generation numbers are expressible by the generation number region by adding the judgment result to the most significant bit of the generation number. In the former half sub-range (the most significant bit=0), there are expressed the generation numbers that are those before making one circuit of the range in which they can be expressed by the number region. In the latter half sub-range (the most significant bit=1), there are expressed the generation numbers that are those having made one circuit of the range in which they can be expressed by the number region. The generation numbers are compared in these sub-ranges, and hence the program can be operated while maintaining the sequence of the generations.

According to the second aspect of the invention, the firing process module incorporates an address conversion unit with the intention of obtaining the most significant bit of the generation number region as a hash address of the queuing memory, thereby completely eliminating the possibility of causing a deadlock due to a stoppage in processing even when performing the generation execution in excess of the generation number region.

BRIEF DESCRIPTION OF THE DRAWINGS

Other objects and advantages of the present invention will become apparent during the following discussion taken in conjunction with the accompanying drawings, in which:

FIG. 5 (b) is a diagram showing a range in which the generation numbers are expressible by the generation number region plus a judgment bit;

FIG. 5 (c) is a diagram showing a range of residence generation number of FIG. 5 (b);

FIG. 5 (d) is a diagram showing a range of FIG. 5 (c) which corresponds to FIG. 5 (a);

DETAILED DESCRIPTION OF THE EMBODIMENT

Figure 1:
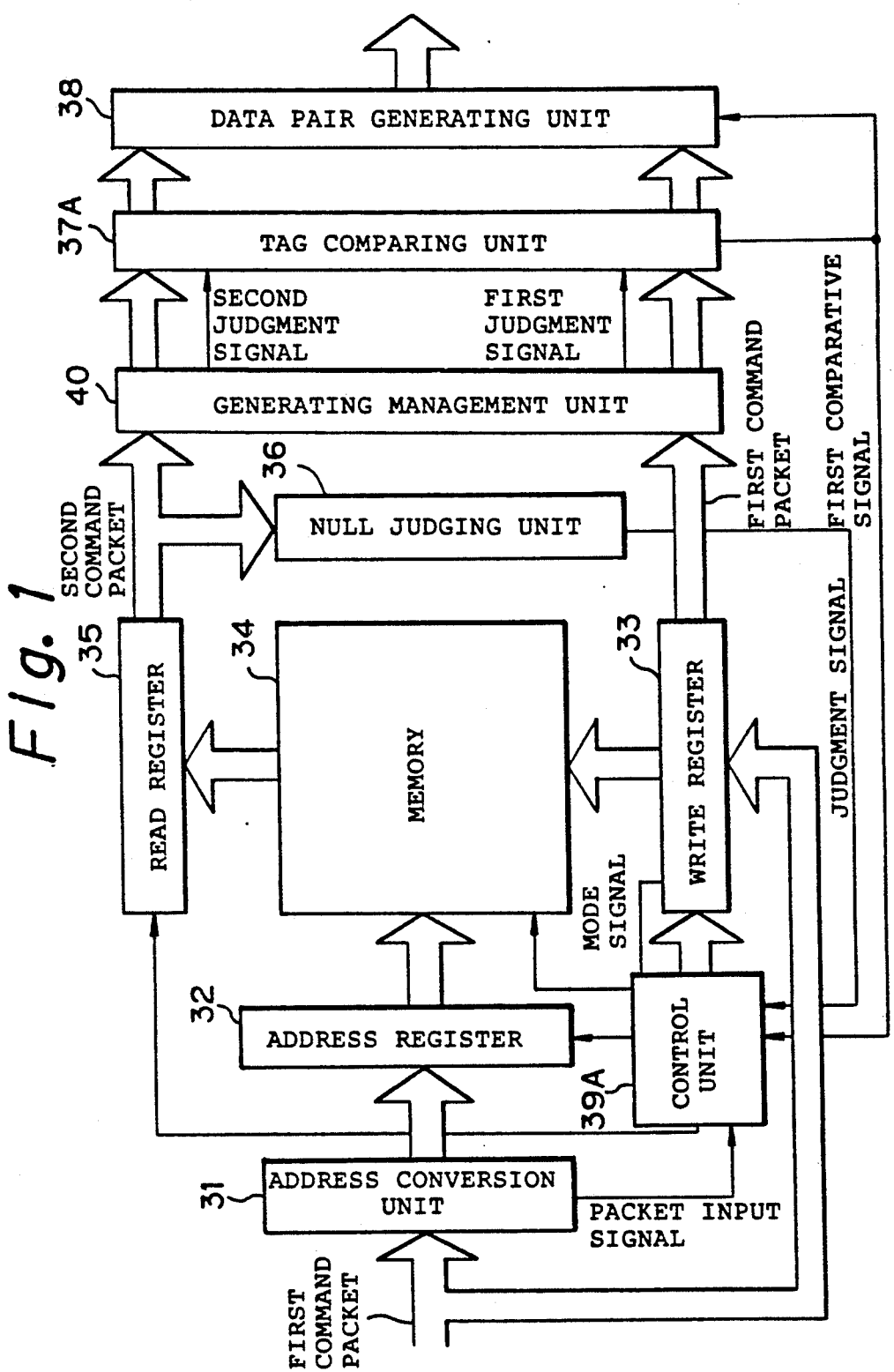
FIG. 1 is a block diagram illustrating a firing process module of a data driven type processor in one embodiment of the present invention.

Turning first to FIG. 1, there is illustrated a block diagram of a construction of a firing process module in one embodiment of the present invention. In FIG. 1, the numerals 31 through 38 are represent the same components as those shown in the prior art. Designated at 40 is a generation management unit for judging whether generation numbers of a packet are those after (establishing a relationship such as the generation number =0) or before making one circuit of a range showing a generation number region as one unit. In the case of post-circuiting numbers, a judgment bit of "1" is outputted to a tag comparing unit 37A which will hereinafter be mentioned. Whereas in the case of pre-circuiting numbers, a judgement bit of "0" is outputted thereto. The tag comparing unit 37A adds the judgment bit, as the most significant bit of the generation number, which is outputted from the generation management unit 40, to the tags of a second command packet outputted from a read register 35 via the generation management unit 40 and of a first command packet outputted from a write register 33 via the generation management unit 40. After making a comparison between the tags, the tag comparing unit 37A judges an accordance or magnitudes thereof and outputs the comparative result as a first comparative signal. In the case of "accordance", both of the first and second command packets are outputted. Whereas in the case of "discordance", one of them, which has a larger tag, is outputted. The reference symbol 39A denotes a control unit for, immediately after receiving a packet input signal, a judgment signal and a first comparative signal, effecting the following control operations. The details are given as below:

(1) Control over reading from or writing to the queuing memory 34;
(2) Control over outputting PB2 of the read register 35 to the null judgment unit 36 or the second command packet to the generation management unit 40;
(3) Control over outputting the first command packet of the write register 33 to the generation management unit 40; and
(4) Control over writing of the command packet and PB1 to the queuing memory 34 under such conditions that if the first comparing signal indicates the "accordance", PB1 of the write register 33 is made invalid; and whereas if the "discordance" is indicated, PB1 is made valid.

The description will next be centered on the operation.

Figure 14:
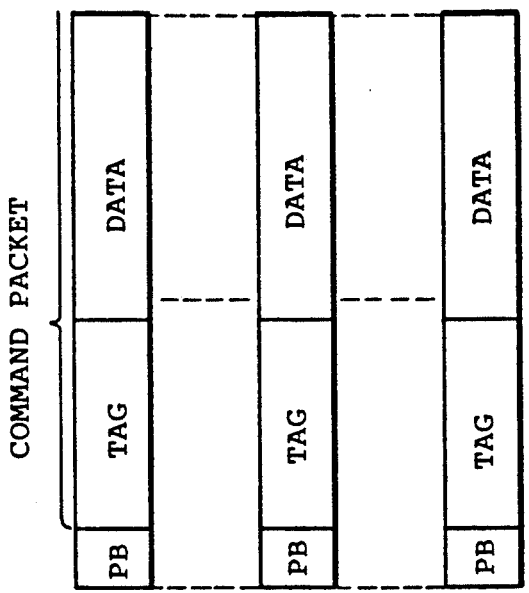
FIG. 14 is a diagram showing a format stored in a queuing memory depicted in FIG. 10.
Figure 15:
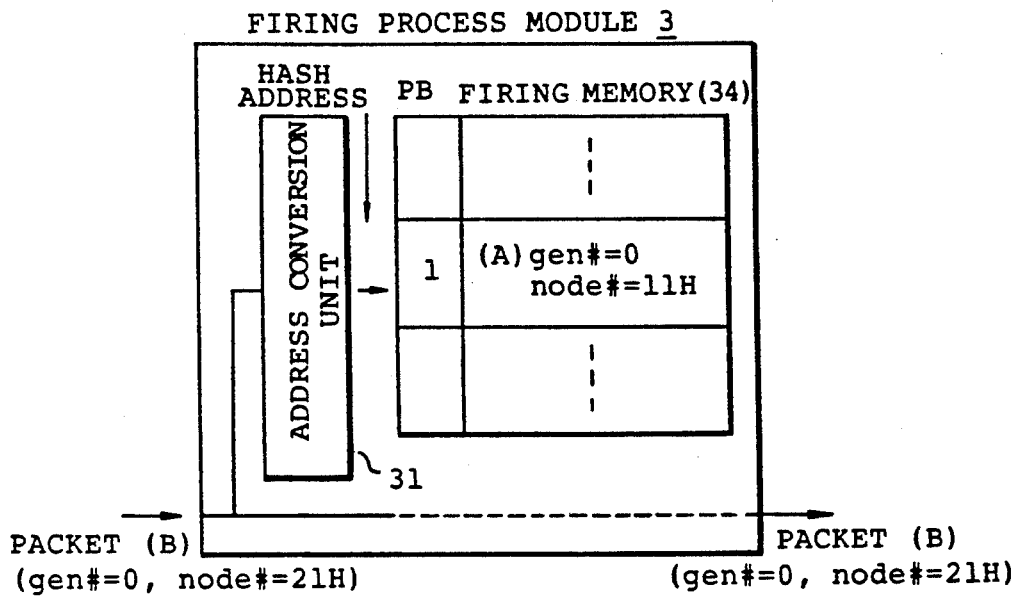
FIGS. 15 (a) and 15 (b) are diagrams of assistance in explaining operations of replacing the data of the firing process module.
Figure 15:
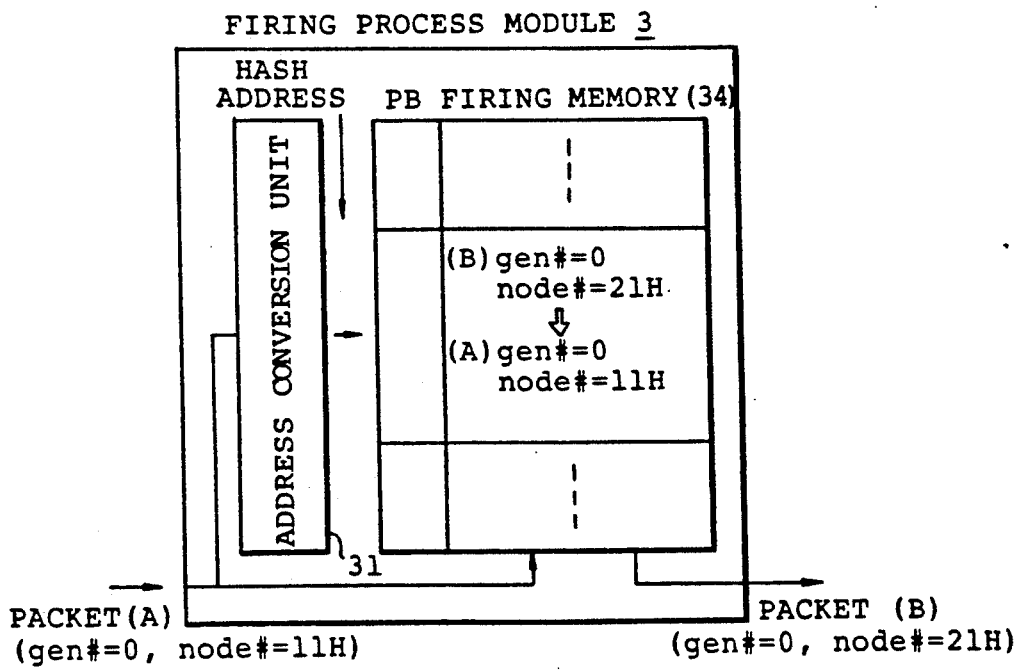

A first command packet outputted from the program storing module 2 is inputted to the write register 33 as well as to the address conversion unit 31. The address conversion unit 31 functions to output, to a control unit 39A, a packet input signal showing that the first command packet has been inputted. The conversion unit 31 hashes the generation number or color number and the destination node number which are tag components of the first command packet, and outputs a predetermined memory address of the queuing memory 34. The control unit 39A to which the packet input signal has been inputted effects a control process to hold the memory address outputted from the address conversion unit 31 to the address register 32, whereby the address register 32 holds the memory address. Next, the control unit 39A outputs, as an indication of "reading", a mode signal showing a memory reading mode or a memory writing mode to the queuing memory 34. The control unit 39A controls the address register 32 so that the register 32 outputs the memory address held therein to the queuing memory 34. The queuing memory 34, to which the mode signal and the memory address have been inputted, has, as illustrated in FIG. 14, a command packet including tags and data and also PBs as a set of information. The PB among the information represents bits indicating whether the tags and data are valid or not.

The queuing memory 34 receives the mode signal and the memory address outputted from the address register 32, and takes out the PBs and the command packet which are stored in a LOCATION, specified by the memory address, of the queuing memory 34 in order to output these PBs and the command packet to the read register 35. PB2 held by the read register 35 is outputted from the read register 35 to the null judgment unit 36 under control of the control unit 39A. The null judgment unit 36 in turn outputs, to the control unit 39A, PB2 outputted from the read register 35 as a judgment signal. Upon receiving the judgment signal, the control unit 39A writes, when this signal indicates an invalidity, a validity to PB1 of the write register 33. The control unit 39A then outputs the mode signal which has been set in "writing" to the queuing memory 34, and performs a control process to cause the address register 32 to output the memory address held therein to the queuing memory 34. Simultaneously, the control unit 39A causes the write register 33 to output the first command packet and PB1, which are held therein, to the queuing memory 34. The queuing memory 34, to which the mode signal indicating a "writing" mode has been inputted, stores PB1 and the first command packet which are outputted from the address register 32 to the memory address outputted from the address register 32.

Therefore, when the judgment signal indicates the invalidity, a region in the queuing memory 34 which is specified by the memory address held by the address register 32 is null. The first command packet and PB1 which are held by the write register 33 are stored in the queuing memory 34, thereby having the command packet including the same tag.

When the judgment signal shows the valid state, the control unit 39A effects control to permit the write and read registers 33 and 35 to output, to the generation management unit 40, the first and second command packets held by the write register and read registers 33 and 35.

Figure 2:
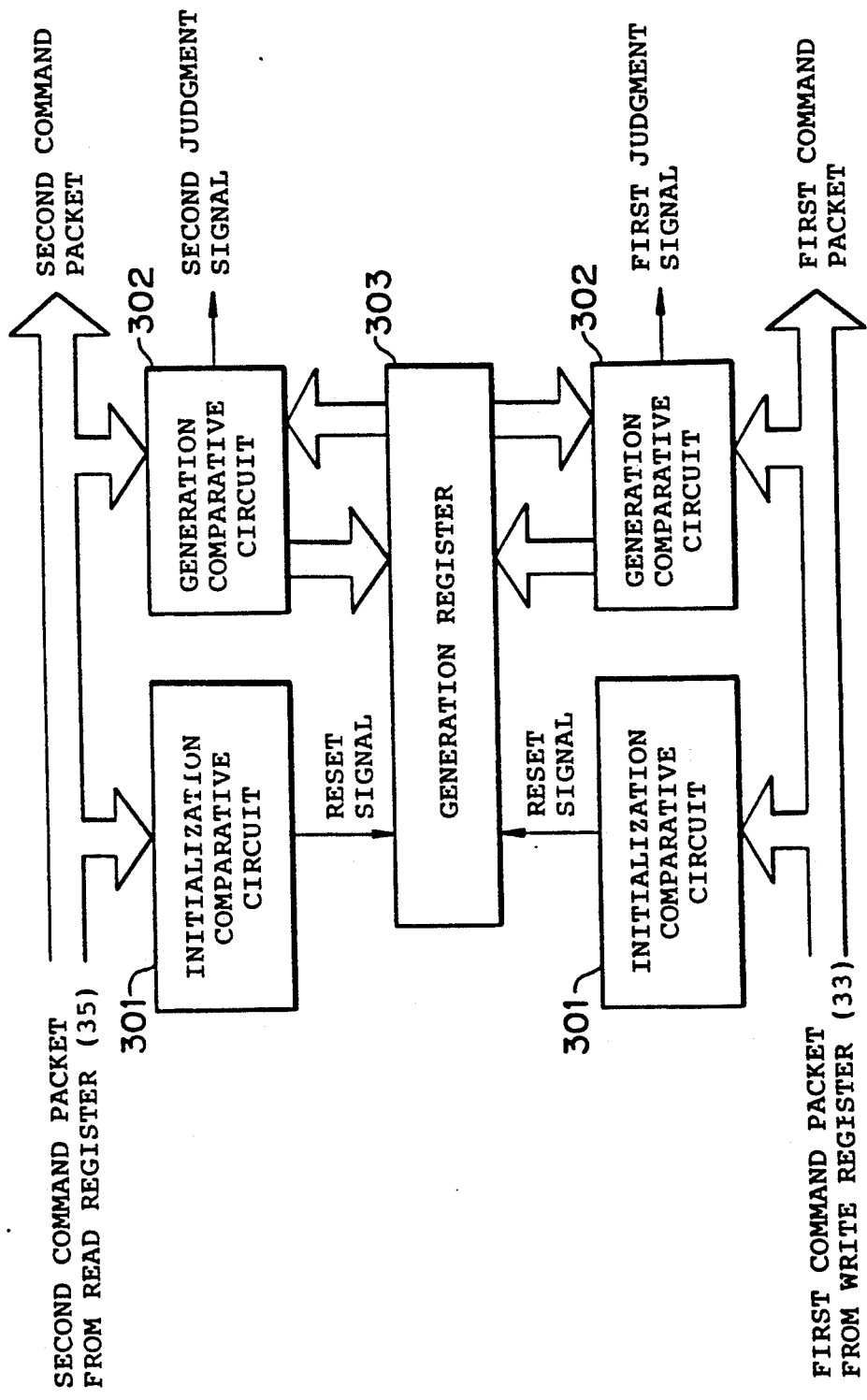
FIG. 2 is a block diagram depicting a generation management unit of FIG. 1.

The operation of the generation management unit 40 will be explained in conjunction with FIG. 2.

For instance, when the generation number region is set to 7 bits, a range in which the generation numbers are expressible by this region is more than 0 but less than 127 [see FIG. 5(a)]. The generation numbers expressible by 8 bits obtained by adding a judgment signal (a judgment bit) to the most significant bit of these 7 bits are more than 0 but less than 255, which range is twice as large as the range in which the generation numbers can be expressed only by the generation number region [see FIG. 5(b)]. In the region including this judgment bit, a former half sub-range includes 0 to 127, while a latter half sub-range includes 128 to 255. A comparison between the generation numbers is effected within these sub-ranges. The generation numbers are expressible within these sub-ranges, but the actual generation numbers are infinite. Now, an actual generation number (g) is expressed in the following manner, where the cardinal number is given by the maximum number expressible by the generation number region + 1(b).

$$g = b \times m + n$$

where
b: the maximum number expressible by the generation number region + 1 (=128)
m: the integers greater than 0
n: the integers (greater than 0 but smaller than 127) of a range in which the expression by the generation number region can be made.

Now, one assumption is that the number of residence generations within the processor is b−1 at the greatest. Let no be the generation number indicated by the tag of the latest packet inputted to the processor. Another assumption is that the generation number is incremented one by one in the order of generations of the packet inputted to the processor.

Figure 6:
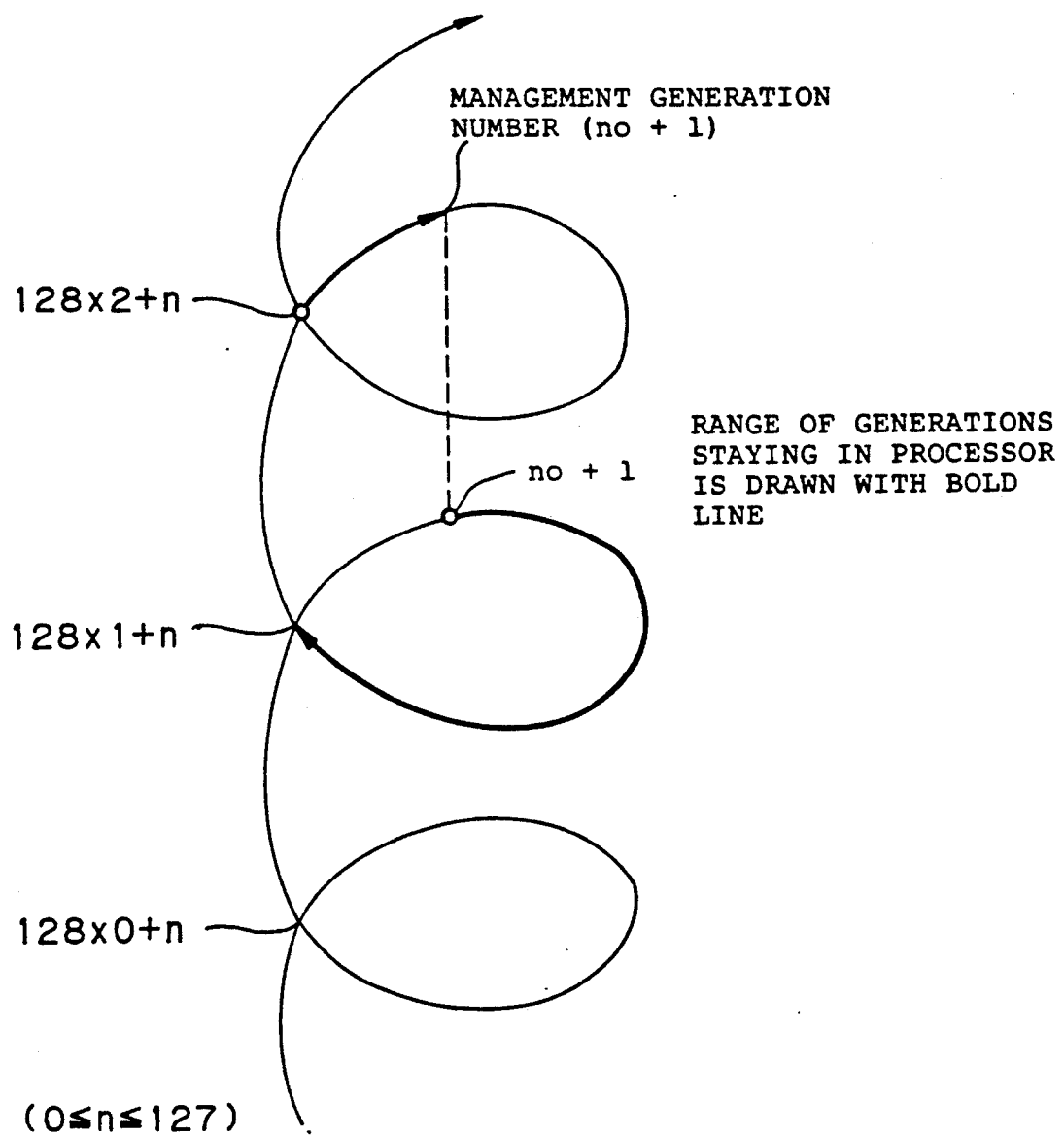
FIG. 6 is a diagram of assistance in explaining management generation numbers.

Based on these assumptions, a range (drawn with a bold line of FIG. 6) of actual generation numbers of the packet which stays in the processor is expressed such as:

$$b \times (m-1) + (no+1) < g \leq b \times m + no.$$

In this case, (no+1) is referred to as a management generation number.

A range of the above-mentioned generation numbers [see FIG. 5(c)] is given by:

$$no + 1 < g' \leq b + no$$

$$\{g' = g - [b \times (m-1)]\}$$

where g' coincides with the range of the generation numbers expressed by adding the judgment bit.

The generation management unit 40 manages the management generation number and at the same time outputs a judgment signal (judgment bit) in the following manner on the basis of the generation numbers (gen#: 0 ≤ gen# ≤ 127) which are expressed by the generation number region conceived as a part of the tags of the command packet received by the generation management unit 40.

When $$gen\# \leq no,$$

$$b < g' \leq b + no,$$

and hence, when the judgment bit = 1 gen# > no, $$no + 1 < g' \leq b$$

so that the judgment bit = 0.

Next, the present invention will be described by way of specific examples.

Figures 4, 5:
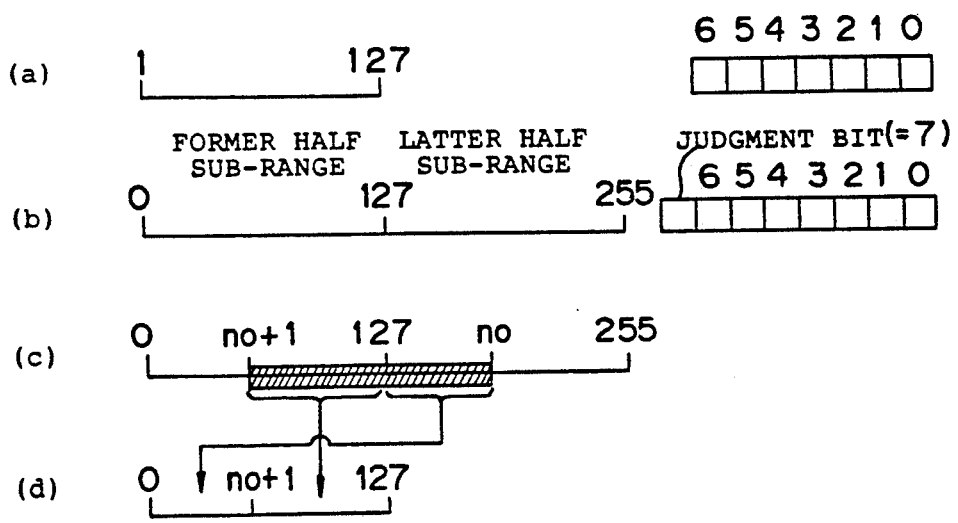
FIG. 4 is a diagram showing correspondence of generation numbers to judgement bits according to the present invention.
FIG. 5 (a) is a diagram showing a range in which the generation numbers are expressible by a generation number region.

The generation numbers which are expressed by the generation number region conceived as a part of the tag of the command packet inputted to the generation management unit 40 are set in the order shown in FIG. 4.

Based on this assumption, when inputting the command packet in which the number indicated by the generation number region is gen#126, this numeric value is smaller than the management generation number (=127). Hence, the judgment bit=1 is outputted in conformity with a rule of the above-mentioned judgment bit output. Therefore, in the case of an expression by using the generation numbers including the judgment bit, 128+126=254. On the basis of this value, a comparison between the generation numbers is performed.

When inputting the command packet having gen#127, this generation number is identical with the management generation. The generation management unit 40 conceives this as an input of a new generation and therefore updates the management generation number. At this time, 127 is the maximum number expressible by the generation number region, so that the next management generation number becomes 0 (127+1=128→0). A judgment bit of 0 is out putted, because gen#127>0.

Subsequently, when the generation number gen#0 is inputted, this coincides with the management generation number. Since this is deemed as an input of a new generation, thereby updating the management generation number (0+1→1). Then, the judgment bit of 1 is outputted, because gen#0<1. At this time, a representation of the generation number including the judgment bit is 128+0=128.

When gen#127 is inputted again to the generation management unit 40, similarly, the judgment bit of 0 is outputted. At this time, the representation of the generation number inclusive of the judgment bit is 127. From the fact that the representation of the generation number (exclusive of the judgment bit) of the packet inputted one ahead to the generation management unit 40 is 128 when the judgment bit is added thereto. In this state, it can be said that the order of two generations is maintained.

The command packet passing through the generation management unit 40 is inputted together with the judgment bit to the tag comparing unit 37A in the manner discussed above.

Figure 3:
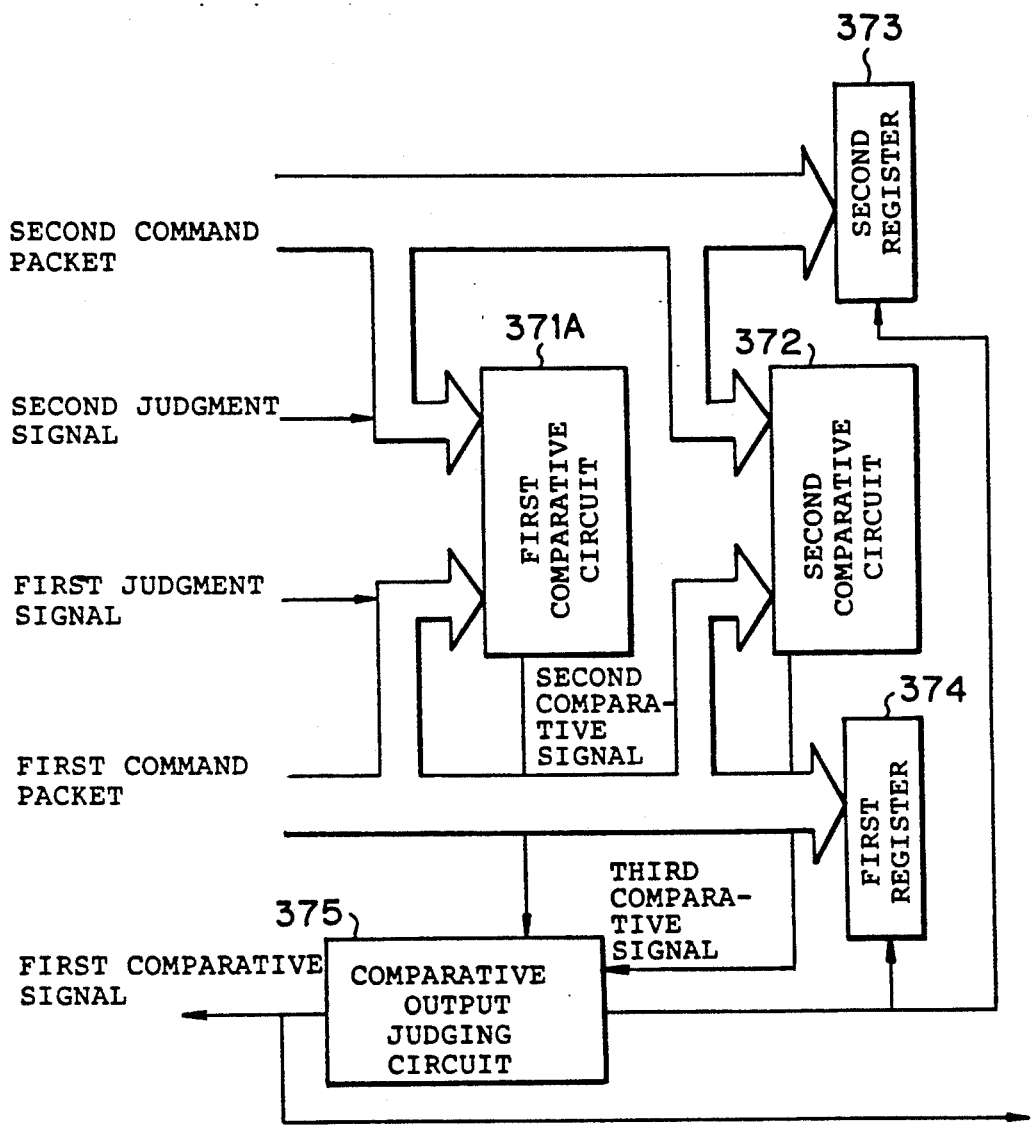
FIG. 3 is a block diagram showing a tag comparing unit of FIG. 1.

The operation of the tag comparing unit 37A will next be explained with reference to FIG. 3. The first command packet outputted from the write register 33 via the generation management unit 40 is held by a first register 374, while the second command packet outputted from the read register 35 via the generation management unit 40 is held by a second register 373. Sent to a first comparative circuit 371A are the judgment bit outputted from the generation management unit 40 and generation or color numbers defined as a part of tags of the first and second command packets outputted from the write and read registers 33 and 35. Destination node numbers are transferred to a second comparative circuit 372. The first comparative circuit 371A behaves to add the judgment bits to the most significant bits of the generation or color numbers of the two command packets for making comparisons therebetween and judges an accordance or magnitudes thereof. The circuit 371A then outputs the comparative result as a second comparative signal to a comparative output judging circuit 375. The second comparative circuit 372 compares the destination node numbers of the two packets and judges the accordance or magnitudes thereof. The comparative result is outputted as a third comparative signal to a comparative output judging circuit 375. The comparative output judging circuit 375 in turn outputs, when the second comparative signal indicates a "discordance (an impingement of the packets)", the second comparative signal as a first comparative signal. The first and second registers 374 and 373 are so controlled that one of the two command packets which has a larger generation or color number is outputted. If the second comparative signal shows a "discordance", the third comparative signal is outputted as a first comparative signal. When the third comparative signal exhibits the "accordance", the first and second registers 374 and 373 are controlled to output both of the command packets. Whereas if the "discordance (an impingement of the packets)" is exhibited, one of the two packets which has a larger destination node number is outputted.

Referring again to FIG. 1, the data pair generating unit 38 receives the first comparative signal outputted from the tag comparing unit 37A and both or any one of the first and second command packets. If the first comparative signal shows the "accordance", there is outputted the packet as an arithmetic packet with an addition of data of the second command packet to the data unit of the first command packet which is indicated by an L/R flag of the second command packet. When the first comparative signal shows the "discordance", a through-packet flag of the first or second command packet is brought into a through-state, and this command packet is outputted as a through-packet.

The control unit 39A receives the first comparative signal and makes, when this signal indicates the "accordance", PB1 of the write register 33 invalid. When giving an indication of being smaller than the tag of the first command packet, PB1 of the write register 33 is made valid. Concomitantly with this, a mode signal exhibiting "writing" is outputted to the queuing memory 34. The address register 32 is controlled to output a memory address held therein, while the write register 33 is controlled to output PB1 and the first command packet which are held therein. Subsequently, the queuing memory 34 stores the first command packet and PB1.

Figure 9:
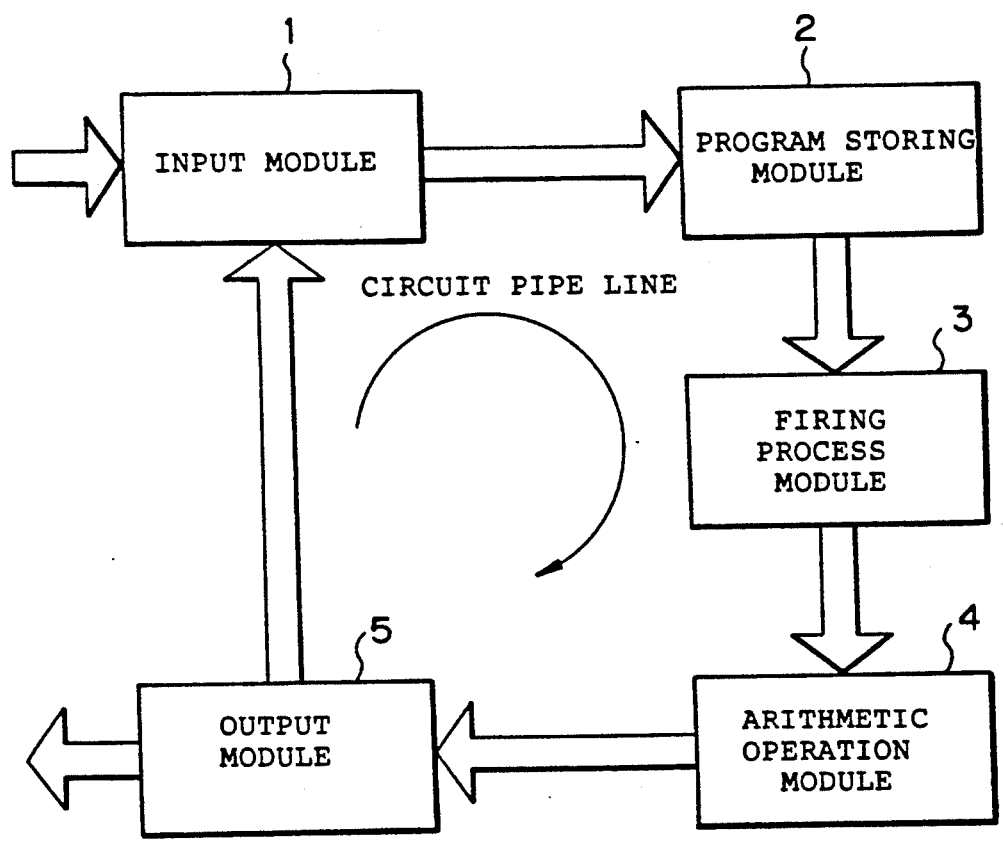
FIG. 9 is a block diagram illustrating a conventional data driven type processor.
Figure 10:
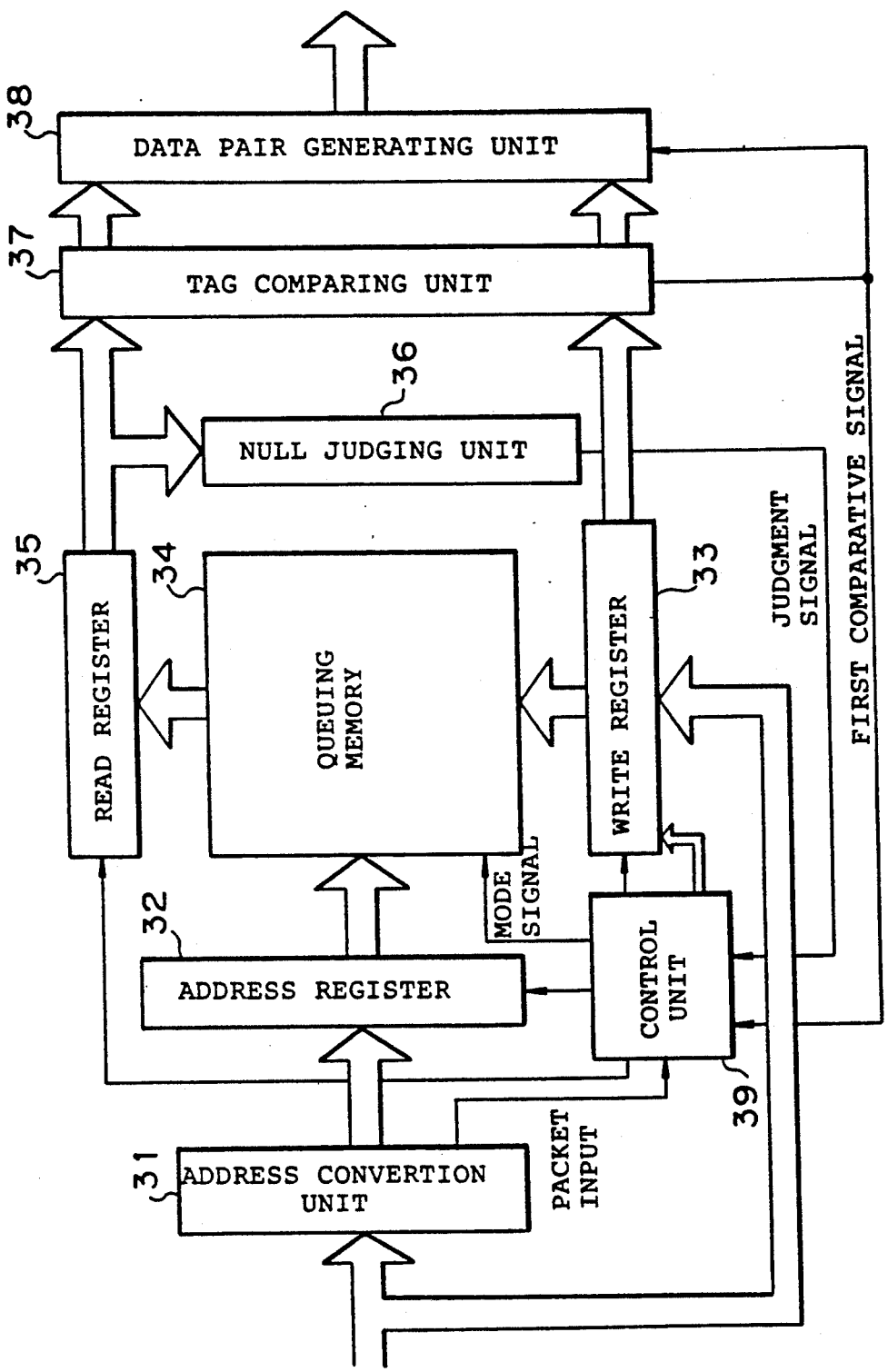
FIG. 10 is a block diagram showing the firing process module of FIG. 9.
Figure 11:
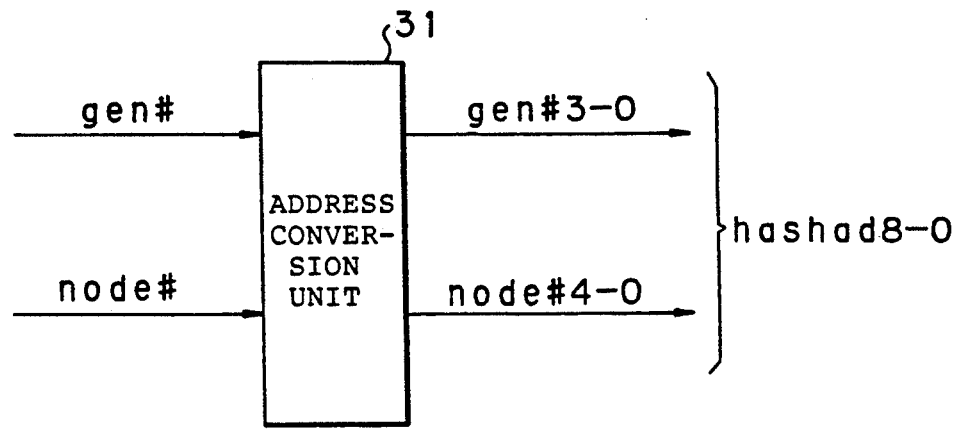
FIG. 11 is a block diagram showing the address conversion unit of FIG. 10.
Figure 12:
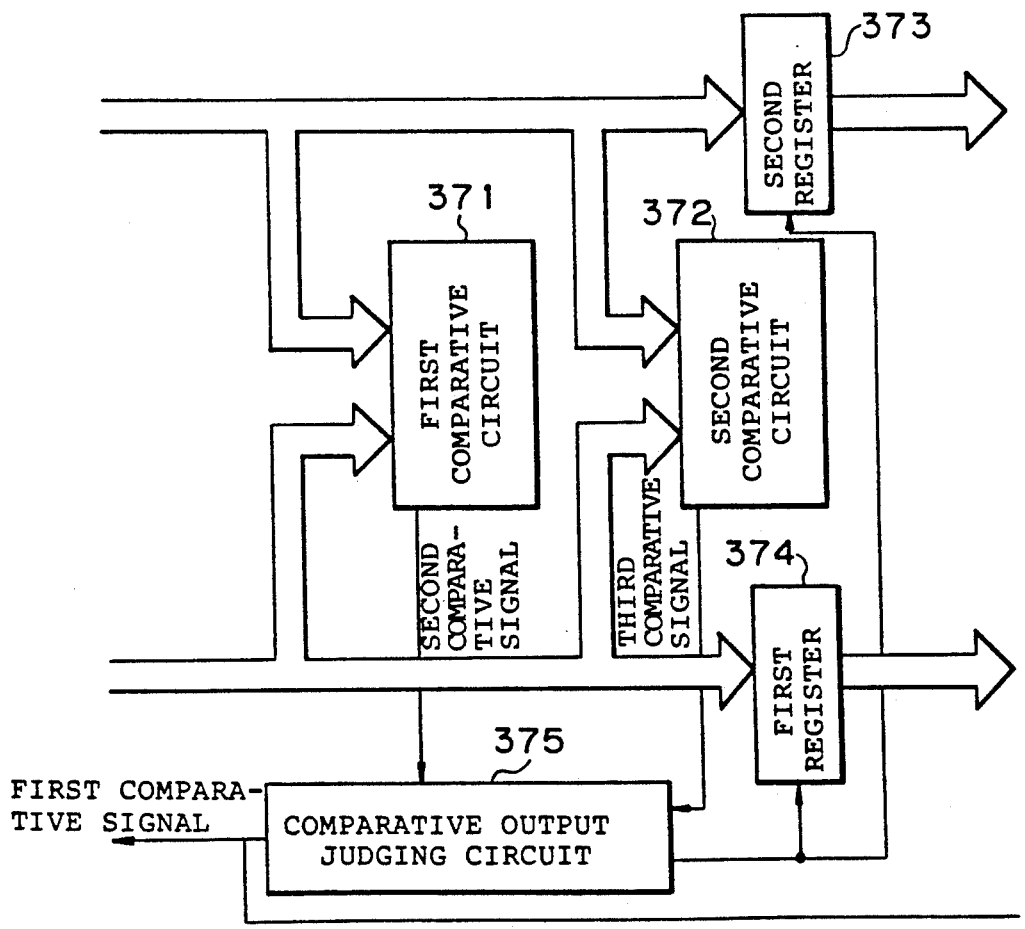
FIG. 12 is a block diagram illustrating the tag comparing unit of FIG. 10.
Figure 13:
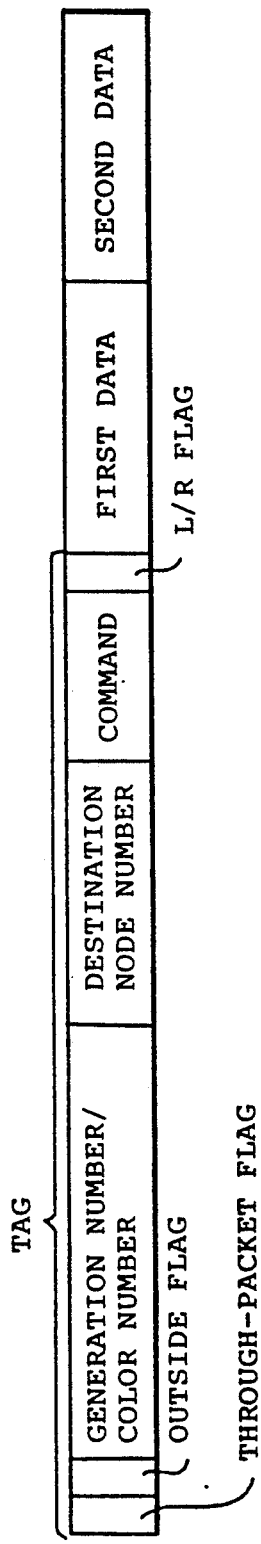
FIG. 13 is a diagram showing a format of a packet.

The description given above has deal with the arrangement that there are sequentially, as illustrated in FIG. 9, disposed the program storing module, the firing process module and the arithmetic operation module on a route leading from the input module to the output module. As a matter of course, however, if these components are arranged in an order such as this: the firing process module, the arithmetic operation module and the program storing module, the present invention can be actualized by investing them with absolutely identical functions.

As discussed above, the generation management unit of the firing process module acts to judge whether the generation numbers of the packet inputted are those after or before making the circuit of the number region. The result thereof is then outputted to the tag comparing unit, wherein the judgement result is added to the most significant bit of the tag generation number to provide a range that is twice as large as the range in which the generation numbers are expressible by the generation number region. The generation number before exceeding the region is expressed in the former half sub-range (the most significant bit=0), while the generation number after exceeding the region is expressed in the latter half sub-range (the most significant bit=1). A comparison between the generation numbers is made in these sub-ranges, and hence the order of the generations can invariably be maintained. Besides, the program can be operated with stability.

One embodiment of the second aspect of the present invention will be described in conjunction with the figure.

Figure 7:
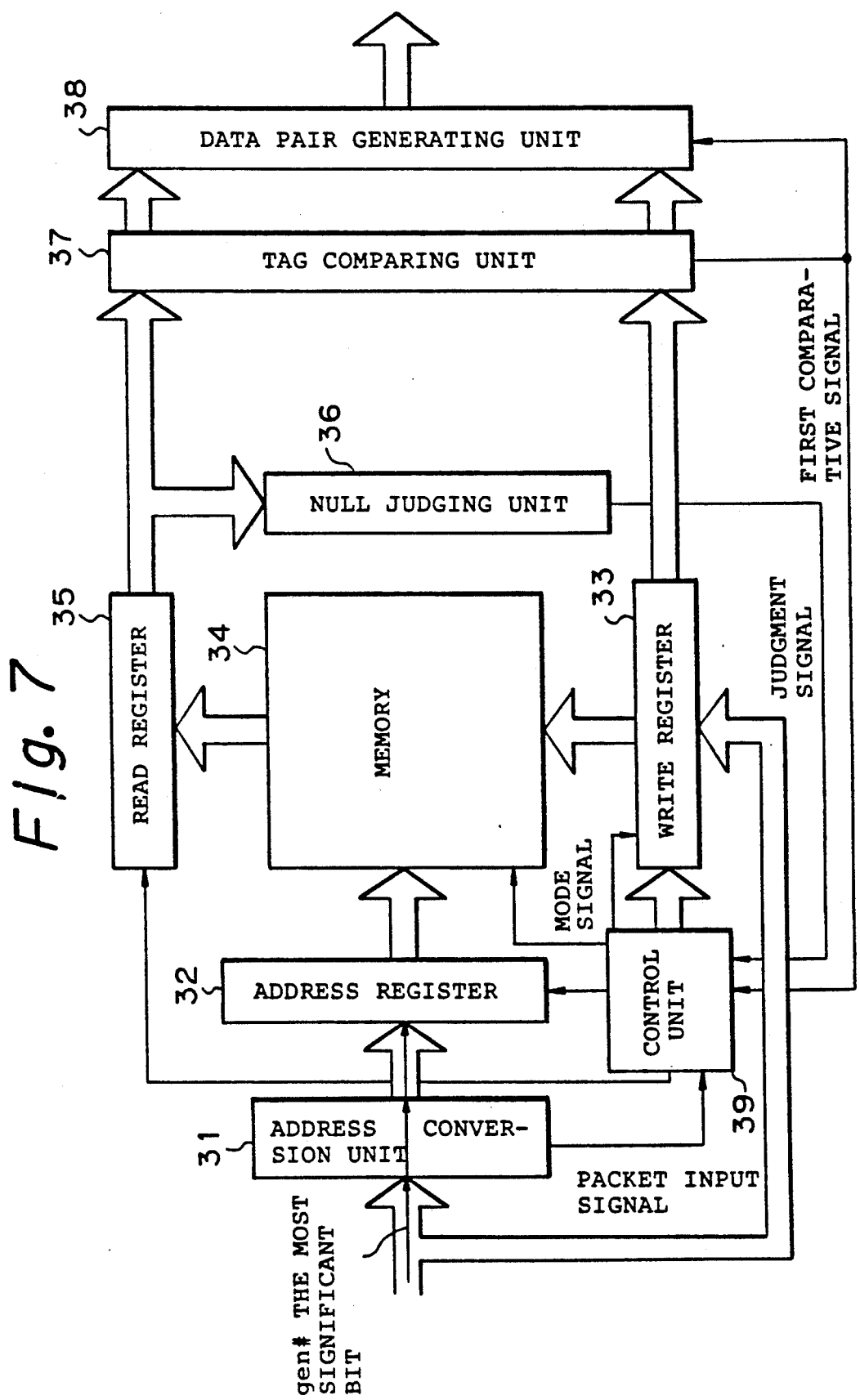
FIG. 7 is a block diagram illustrating the firing process module of the data driven type processor in one embodiment of the invention.
Figure 8:
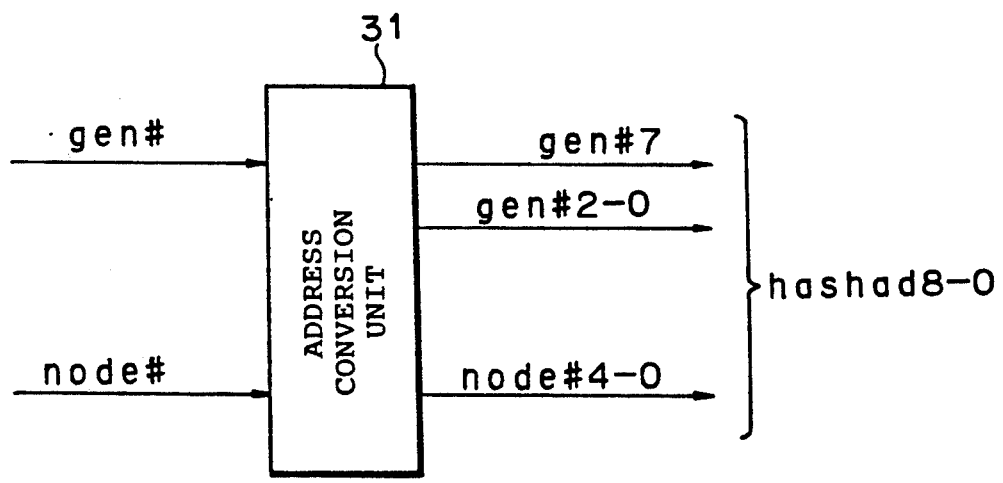
FIG. 8 is a block diagram depicting an address conversion unit for generating a hash address in one embodiment of the invention.

FIG. 7 is a block diagram depicting a construction of the firing process module in one embodiment of the second aspect of the invention. Referring to FIG. 7, the numerals 31 through 39 represent the same components as those shown in the prior art.

A hash address is generated in the address conversion unit 31 of the firing process module 3. Based on the prior art, only low-order bits of a generation number (gen#) and a node number (node#) are selected. Simply for reducing a probability of hash impingement, there may be effected a module operation, multiplication, an exclusive OR, and addition/subtraction of the bits of gen# and node#.

This embodiment, however, aims at actualizing high speed processing associated with an execution of the multi-generations. The execution of the multi-generations is intended to improve both an apparent parallel processability in the data driven type processor and a process throughput, which involves the steps of adopting the same generation number (gen#) with respect to a set of data inputs in which to perform the same process and inputting sets of data inputs not of a single-generation but of multi-generations as far as the hardware source permits on the occasion of processing gen#.

As shown in the embodiment of the prior art, there is effected a priority process (a data replacing method) for executions sequentially from a younger generation number (gen#) and node number (node#) in the firing process module 3. In the case of executing the multi-generations, when inputting a generation which exceeds the generation number (gen#) region, it follows that the generation number of a set of data inputs which are to be inputted later becomes small invariably. To be specific, when the generation number (gen#) is 8 bits, gen# is inputted while adopting the generations with respect to sets of data inputs in the order of ... 253, 254, 255, 0, 1, 2 ... In such a situation, if there exist a plurality of generations which stay in the processor, a priority of residence in the queuing memory 34 of the firing process module 3 is given to the younger of the generation numbers (gen#), while the larger of the generation numbers is temporarily ejected to an outside circuit pipe line. Therefore, the generations of the larger and older generation number (gen#) do not undergo the execution, resulting in a deadlock in the worst case. To cope with this situation, the firing process module 3 makes use of an address conversion unit 31 constructed to invariably impart the maximum bit of the generation number (gen#) to an address (hashed) of the queuing memory 34. This arrangement permits the execution of the multi-generations in excess of the generation number region, which in turn ameliorates the process throughput.

The above-described embodiment has offered a method which simply applies the maximum bit of the generation number to the hashed address of the queuing memory. For obtaining the same effects, any arrangements are, however, available on condition that a hash space (a region to be hashed) is changed over when replacing the priority of the generation numbers.

The description given above has dealt with the arrangement that the components are, as illustrated in FIG. 9, disposed sequentially from the program storing module, the firing process module and the arithmetic operation module on the route leading from the input module to the output module. The same effects can, as a matter of course, be obtained by arranging these components in the following order: the firing process module, the arithmetic operation module and the program storing module. As discussed above, in accordance with the present invention, it is possible to obtain a data driven type processor capable of securing the execution of multi-generations even when inputting a generation number of the packet inputted to the firing process module in excess of the number region thereof in the generation number exceeding the generation number region by separating the hash space, if the number of residence generations is smaller than the maximum value of the generation number, and also executing data driven processing of a high and stable throughput.

Although the illustrative embodiments of the present invention have been described in detail with reference to the accompanying drawings, it is to be understood that the present invention is not limited to those embodiments. A variety of modifications may be effected therein by one skilled in the art without departing from the scope or spirit of the invention.

We claim:

1. A data driven type processor for processing token packets of data, each containing data and a tag for identifying said data, said tag containing a generation number, said processor comprising:

an input module means for receiving said packets;

a program storing module means, responsive to said input module means, for accessing a particular program previously stored therein based on information in the tag of one of said packets, and for modifying the tag of said one packet with the content of said program;

a firing process module means, responsive to said program storing means, for generating operand pairs from the tag of said one packet when said one packet is ready for execution and for storing said one packet into a memory when said one packet is not ready for execution;

an arithmetic operation module means, responsive to said firing process module means, and to arithmetic information included in the tag of said one packet for effecting a process on said one packet and for producing a resultant packet therefrom; and an output module means, responsive to said arithmetic operation module means and coupled to said input module means, for determining whether said one packet is to be selectively outputted from said processor or forwarded to said input module means for internal reprocessing in said processor, said firing process module means comprising:

a generation management means for determining whether the generation number contained in the tag of said one packet is within a range expressible by a generation region number contained in said tag and for producing the result thereof by outputting a judgment bit; and a tag comparing means receiving the judgment bit and responsive to said generation management means and the judgment bit, for adding said output result of said generation management unit to the generation number of the tag of said one packet and for maintaining the execution sequence of said packets, wherein the execution sequence of generations is maintained even if the generation number of said one packet is in excess of said generation region number evidencing a potential missequencing.

2. An apparatus as described in claim 1 wherein said generation region number is expressible as a number including a plurality of bits.

3. An apparatus as described in claim 2 wherein said firing process module means further comprises an address conversion unit means, responsive to said generation number region, for obtaining the most significant bit thereof to generate a hash address for a memory contained in said address conversion unit.

4. An apparatus as described in claim 2 wherein said output result of said generation management union is comprised of a judgment bit having a binary value.

5. An apparatus as described in claim 4 wherein said tag comparing means adds said judgment bit to the most significant bit of the generation number region to obtain a range which is twice as large as that expressable by the generation number region of said tag.

6. A data driven type processor for processing token packets of data each containing data and a tag for identifying said data said tag containing a generation number, said processor comprising:

an input module means for receiving said packets;

a program storing module means, responsive to said input module means for accessing a particular program previously stored therein based on information in the tag of one of said packets and for modifying the tag of said one of said packets with the content of said program;

a firing process module means, responsive to said program storing means, for generating operand pairs from the tag of said one packet when said one packet is ready for execution and for storing said one packet into a memory when said one packet is not ready for execution;

an arithmetic operation module means, responsive to said firing process module means, and to arithmetic information included in the tag of said one packet for effecting a process on said one packet and for producing a resultant packet therefrom; and an output module means responsive to said arithmetic operation module means and coupled to said input module means, for determining whether one packet is to be selectively outputted from said processor or forwarded to said input module means for internal reprocessing in said processor, said firing process module means comprising:

a generation management means for determining whether generation number contained in the tag of said one packet is within a range expressible by a generation region number contained in said tag and for producing the result thereof by outputting a judgment bit; and wherein said firing process module means generates a hashed address of a queuing memory contained therein when the generation number of said one packet exceeds a predetermined generation region number evidencing a potential missequencing.

* * * * *